UNITED STATES PATENT OFFICE.

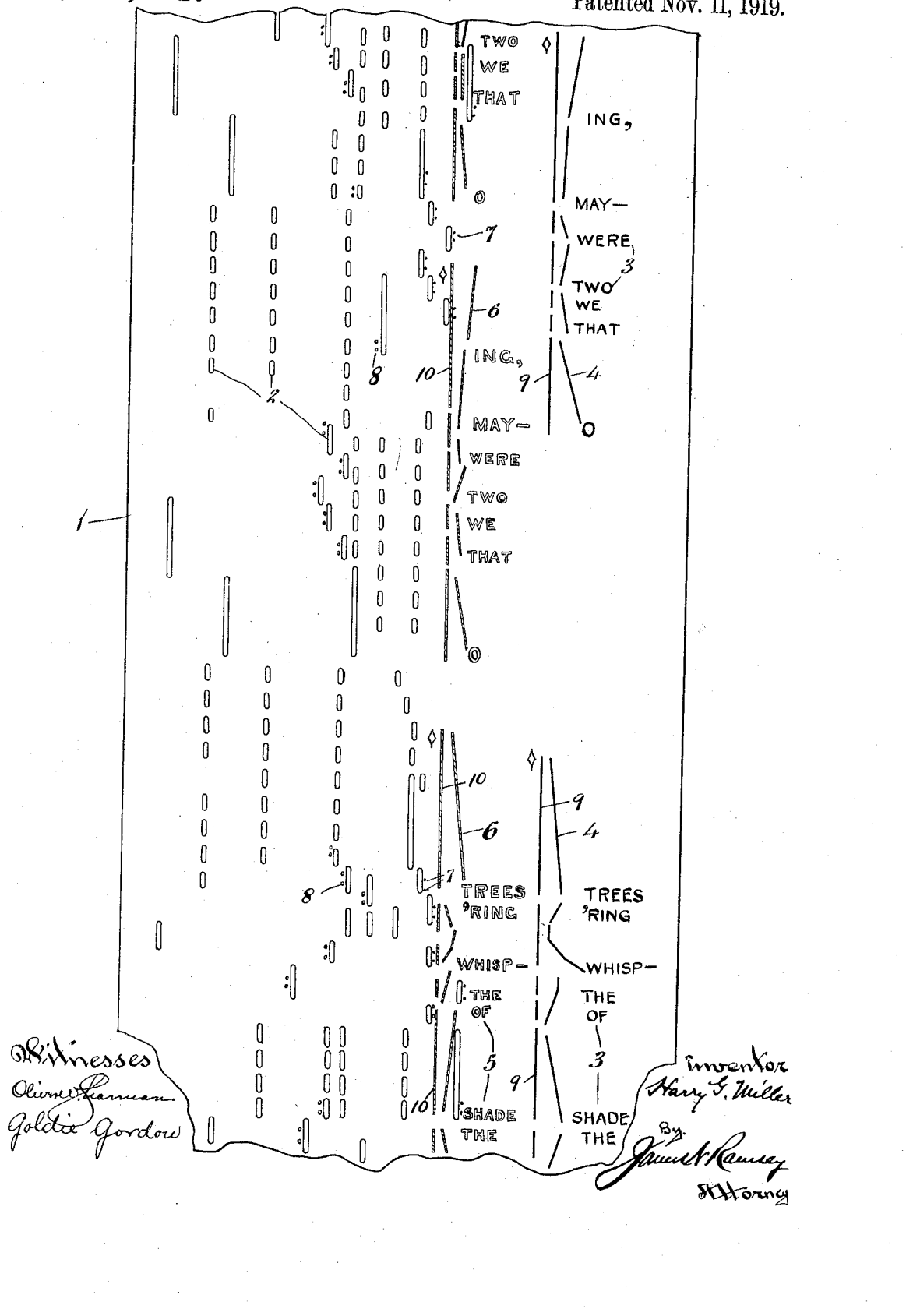

HARRY G. MILLER, OF CINCINNATI, OHIO, ASSIGNOR, BY MESNE ASSIGNMENTS, TO THE VOCALSTYLE MUSIC COMPANY, OF CINCINNATI, OHIO, A CORPORATION OF OHIO.

PERFORATED MUSIC-SHEET FOR AUTOMATIC MUSICAL INSTRUMENTS.

1,321,231.  Specification of Letters Patent.  Patented Nov. 11, 1919.

Application filed October 12, 1911. Serial No. 654,244.

*To all whom it may concern:*

Be it known that I, HARRY G. MILLER, a citizen of the United States, residing at Cincinnati, in the county of Hamilton and State of Ohio, have invented certain new and useful Improvements in Perforated Music-Sheets for Automatic Musical Instruments, of which the following is a specification.

My invention relates to perforated music sheets provided with means for enabling people to sing, with the playing of the instrument controlled by the sheet as an accompaniment; and its object is to more accurately convey to the singer the correct interpretation of the song, as well as to render the sheet less difficult for the singer to read, especially in the case of untrained singers. A further object of my invention is to enable a plurality of persons to sing different parts even though the persons are not trained singers.

My invention consists in the combination in a music sheet of the elements as hereinafter more fully described and claimed.

The drawing is a front view of a part of a perforated music sheet embodying my invention.

This music sheet 1 is provided with the usual perforations or note apertures 2 variously arranged longitudinally and transversely thereof to control the operation of a musical instrument during longitudinal travel across the tracker-board of the instrument.

As shown, these perforations 2 are confined nearer to the left side of the sheet, leaving at the right an unperforated stretch of sheet, which, it will be understood, is continuous throughout the length of the sheet along with the perforations. This unperforated stretch of the sheet is not novel in itself; and such unperforated parts of music sheets have been provided with word characters, very much the same as an ordinary printed music sheet is provided with word characters, arranged opposite corresponding note characters.

However, wherever such an arrangement has been disclosed, the ascertainment by the singer of the pitch of the note depends upon a knowledge of the musical staff as it is used on ordinary printed music sheets, even though such a use on a perforated music sheet in conjunction with the musical instrument played under the control of the sheet provides some assistance to the singer through the sense of hearing. The assistance thus provided, however, is comparatively slight, even where the notes to be sung are the same as some of the notes being played, when these notes are not positively identified to the singer; and where the sung notes and the played notes are not the same, as is frequently the case, then the correct singing depends entirely upon the singer's knowledge of the ordinary musical notation without even the above slight assistance through the sense of hearing.

Furthermore, any such arrangement as has heretofore been provided gives no indication of phrasing.

Also, none of the perforated music sheets heretofore provided with singing characters is adapted to indicate more than one part of a song, even where one part is indicated as successfully as above pointed out; and, so far as I am aware, departure has never been made from the ordinary method of writing songs of two or more parts on ordinary printed music sheets.

I overcome the above defects by providing, in conjunction with the word characters, perforations actually producing the melody tones for the words; and, by suitable characters, identifying the words with the respective perforations, thus making perceptible both to the eye and the ear the guidance in singing.

While thus identifying the word character with some perforation on the sheet, I do not rely upon the length of the perforation to indicate the length or continuity of the tone that the word or syllable is to be sung in; but provide a separate and distinct indicating character for this, besides a character which indicates to the singer the exact phrasing of the word, *i. e.*—the increase or decrease in volume of sound, and not only this, but the rate of such increase or decrease.

Thus, as shown in the drawing where characters for a song of two parts are provided, the word characters 3 of one part have the phrasing characters 4 which consist of lines more or less inclined to the longitudinal direction of the sheet and inclined either to the right or to the left thereof. If inclined to the right, the line indicates an increase in volume, and if to the left a decrease; and the angle of inclination indicates the rate of increase or decrease. The word characters 5 of the other singing part have similar phrasing characters 6.

The word characters 3 and 5 of the respective singing parts and their corresponding phrasing characters 4 and 6 are identified by the identifying characters 7 and 8, each of which consists preferably of two dots, one arranged closely after the other longitudinally of the sheet, alongside the perforation that plays the melody note.

The duration characters 9 and 10, each of which indicates the length of time during which a word or syllable is to be held, are also located in the unperforated part of the sheet directly to the left of the phrasing characters 4 and 6 of the word characters 3 and 5, respectively, which latter are directly to the left of the respective word characters. These duration characters 9 and 10 are not inclined either to the right or left as are the phrasing characters 4 and 6, nor do they have any variation in position transversely of the sheet as do the identifying characters 7 and 8.

It will be noted at the bottom of the figure that the word "shade" in the higher singing part at the right is identified with a continuous long perforation, while the corresponding word in the other singing part is identified with a short perforation succeeded by three similarly short ones in rapid succession; in all equivalent to the long continuous perforation of the other part. Nevertheless the character 10 of this word in the left hand part is long and continuous, as is also the one of the corresponding word in the right hand part. Therefore, it is indicated that the word "shade" in the left or lower part is to be sounded continuously, and not interruptedly as the sounding of the corresponding melody tone will be by the musical instrument on account of the four short perforations that produce this tone. It will therefore be seen that by giving the characters 9 and 10 the function of indicating the length and continuity of the tone, and relying upon their identification with certain perforations for indication of the pitch of the tone, these characters may be arranged in a simple longitudinal line close to the words or syllables which they indicate the duration for, and to the phrasing characters 4 and 6 for those words. Thus a peculiarity of my invention consists in the arrangement of the word characters 3 or 5 and the indicating characters 4 or 6 and 9 or 10 of either singing part adjacent to each other, and providing the melody indication by entirely distinct sets of identifying characters 7 or 8.

My invention is thus well adapted for providing two parts for a song on a perforated music sheet, because of the simple arrangement that is permitted for the word characters 3 and 5 and indicating characters 4 and 6 and 9 and 10, and the ease with which either set of characters may be identified with its melody perforations in the left hand part of the sheet by the identifying characters 7 and 8. In order to increase the ease of identification, the characters belonging to the different parts may be printed or marked on the sheet in a distinctive manner, so that all of the characters belonging to a single part, including the identifying characters adjacent to the perforations, will have an identifying similarity. A very convenient and at the same time very effective means is to print or mark the characters in different colors; as for instance, those at the right may be black and those at the left red, this being indicated on the drawing, respectively, by solid and open markings throughout all of the words and characters.

It will be noted that, as is frequently the case in two part singing, the two singers not only sing in different tones but may sing the corresponding words at different times; and in nearly every instance the phrasing of the words by each singer is different from that of the other singer. However, by having the indicating characters, both for the phrasing and for the length and continuity of the word or syllable, directly adjacent to the character indicating the word or syllable, these characteristics of the singing are clearly indicated to the singer with a minimum of confusion, either with the characters of the other singer's part or the sounds made by the other singer. At the same time the melody is very readily followed by means of the identifying characters 7 and 8, which in turn are more distinct for each one of the singers by being separated from the other characters and not sharing any function or characteristics with any of these other characters.

Furthermore, I have found in practice that the use of these identifying characters with melody perforations enables even inexperienced singers who have little or no knowledge of the conventional musical notation to sing accompanied by the musical instrument played under the control of the sheet embodying my invention. Not only is one singer enabled thus to sing; but two or more singers, each singing a different part, are enabled to sing satisfactorily with very little difficulty even though the singers be not trained in music.

The simple and effective system of indicating the phrasing or variations in volume of the different tones enables any singer to practice the high refinements of singing under the precepts of the higher authorities. This latter is a possibility which even educated singers have been denied unless they could actually hear the authoritative singing and should be capable of carrying in the memory the interpretation of the song as heard. This has been the case because of the absence of any practical graphic method of indicating accurately the correct interpretation of a song. The use of my phrasing characters, and especially their use in conjunction with the other characters, and the peculiar combination and arrangement of all of the characters, contributes greatly to the accuracy with which the interpretation of a song may be recorded and thus disseminated to all of the people desiring a knowledge thereof. The simplicity of the characters and their arrangement greatly adds to the scope of this benefit, because it is possible for persons not having a musical education to not only sing, but to sing in a refined and approved manner.

While I have illustrated a music sheet provided with means for two part singing, it will be understood that my invention is adapted for one part singing or for singing songs with more than two parts. Thus it will be understood that my invention is susceptible of some modification without departing from its scope, which is defined by the following claims:

I claim:—

1. In a music sheet adapted for longitudinal travel and having a series of perforations variously arranged longitudinally and transversely thereof, to control the operation of a musical instrument to play music during its travel, a series of word characters on said sheet, and a series of indicating characters adjacent to said series of word characters, the characters of each of said series being longitudinally arranged with relation to said perforations to properly indicate singing, of which the music played under the control of the perforations is an accompaniment, and a series of identifying characters arranged adjacent to the respective perforations to identify respective ones of said word characters and indicating characters with respective ones of said perforations.

2. In a music sheet adapted for longitudinal travel and having a series of perforations variously arranged longitudinally and transversely thereof, to control the operation of a musical instrument to play a musical part during its travel, a series of word characters on said sheet, a series of duration characters and a series of phrasing characters adjacent to said series of word characters, the characters of each of said series being longitudinally arranged with relation to said perforations to properly indicate a singing part, of which the part played under the control of the perforations is an accompaniment, and a series of identifying characters arranged adjacent to the respective perforations to identify respective ones of said word characters and duration and phrasing characters with respective ones of said perforations.

3. In a music sheet adapted for longitudinal travel and having a plurality of series of perforations variously arranged longitudinally and transversely thereof, to control the operation of a musical instrument to play different musical parts during its travel, a plurality of series of word characters on said sheet, and a plurality of series of indicating characters each adjacent to a respective series of word characters, the characters of each of said series of word characters and respective indicating characters being longitudinally arranged with relation to the perforations of a respective one of said series of perforations to properly indicate a singing part, of which the part played under the control of the respective series of perforations is an accompaniment, and a plurality of series of identifying characters, each of these series of identifying characters having its characters arranged adjacent to the perforations of a respective series of perforations, to identify respective ones of said word characters and indicating characters with said perforations.

4. In a music sheet adapted for longitudinal travel and having a plurality of series of perforations variously arranged longitudinally and transversely thereof, to control the operation of a musical instrument to play different musical parts during its travel, a plurality of series of word characters on said sheet, a plurality of series of duration characters and a plurality of series of phrasing characters each adjacent to a respective series of word characters, the characters of each of said series of word characters and respective duration and phrasing characters being longitudinally arranged with relation to the perforations of a respective one of said series of perforations to properly indicate a singing part, of which the part played under the control of the respective series of perforations is an accompaniment, and a plurality of series of identifying characters, each of these series of identifying characters having its characters arranged adjacent to the perforations of a respective series of perforations, to identify respective ones of said word characters and duration and phrasing characters with said perforations.

5. In a music sheet adapted for longitudinal travel and having a plurality of series of perforations variously arranged longitudinally and transversely thereof, to control the operation of a musical instrument to play different musical parts during its travel, a plurality of series of word characters on said sheet, and a plurality of series of indicating characters each adjacent to a respective series of word characters, the characters of each of said series of word characters and respective indicating characters being longitudinally arranged with relation to the perforations of a respective one of said series of perforations to properly indicate a singing part, of which the part played under the control of the respective series of perforations is an accompaniment, and a plurality of series of identifying characters, each of these series of identifying characters having its characters arranged adjacent to the perforations of a respective series of perforations, to identify respective ones of said word characters and indicating characters with said perforations, the word, indicating and identifying characters for each singing part having an identifying similarity distinctive from the word, indicating and identifying characters for the other singing part.

6. In a music sheet adapted for longitudinal travel and having a plurality of series of perforations variously arranged longitudinally and transversely thereof, to control the operation of a musical instrument to play different musical parts during its travel, a plurality of series of word characters on said sheet, and a plurality of series of indicating characters each adjacent to a respective series of word characters, the characters of each of said series of word characters and respective indicating characters being longitudinally arranged with relation to the perforations of a respective one of said series of perforations to properly indicate a singing part, of which the part played under the control of the respective series of perforations is an accompaniment, and a plurality of series of identifying characters, each of these series of identifying characters having its characters arranged adjacent to the perforations of a respective series of perforations, to identify respective ones of said word characters and indicating characters with said perforations, the word, indicating and identifying characters for each singing part having an identifying color, distinctive from that of all of the characters for the other singing part.

7. In a music sheet adapted for longitudinal travel and having a series of perforations to control the operation of a musical instrument during such travel, a plurality of series of word and voice expression characters, each being sufficiently distinct to be readily distinguishable from any other series thereon.

HARRY G. MILLER.

Witnesses:
JAMES N. RAMSEY,
GOLDIE GORDON.

Copies of this patent may be obtained for five cents each, by addressing the "Commissioner of Patents, Washington, D. C."